Inventor:
WILLY BÜHNER
By McGlew and Toren
ATTORNEYS

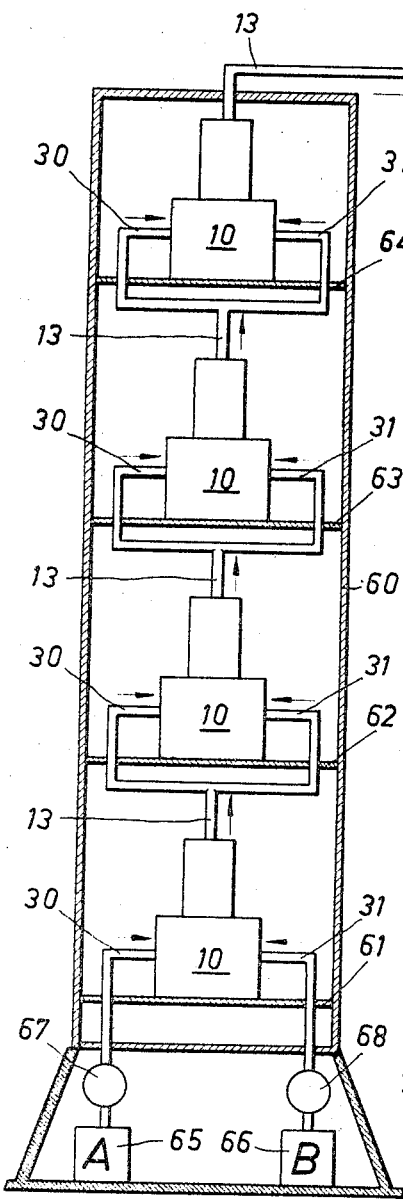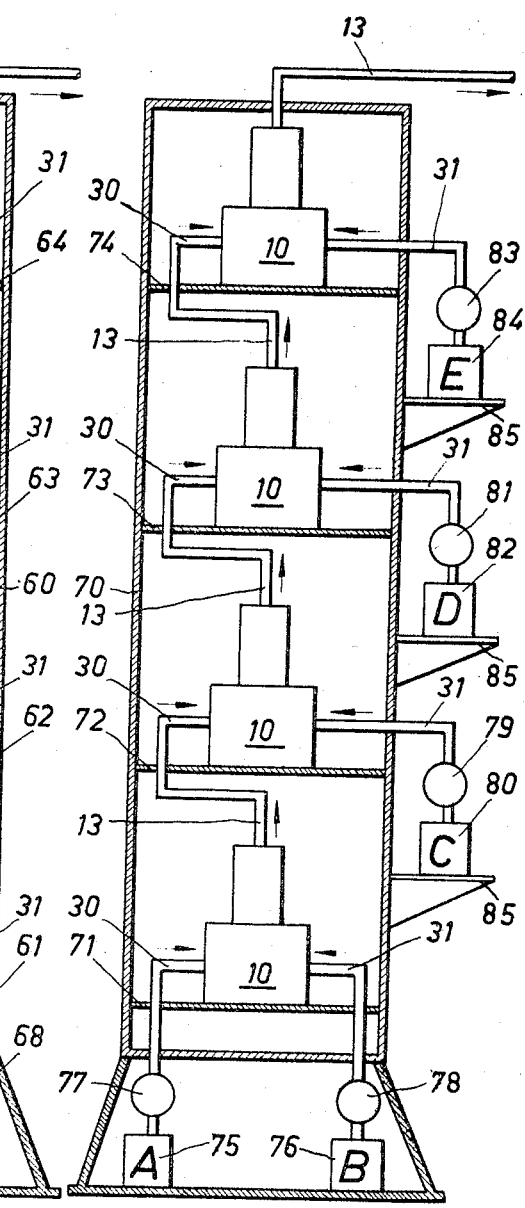

Inventor:
WILLY BÜHNER

Inventor:
WILLY BÜHNER

Inventor:
WILLY BÜHNER

United States Patent Office 3,430,925
Patented Mar. 4, 1969

3,430,925
APPARATUS FOR CONTINUOUS DISPERSION OF PREDOMINANTLY VISCOUS SUBSTANCES
Willy Buhner, 114 Schwachhauser Heerstrasse, Bremen, Germany
Filed Jan. 26, 1967, Ser. No. 611,858
Claims priority, application Germany, May 25, 1966, W 41,667
U.S. Cl. 259—8        21 Claims
Int. Cl. B01f 7/04

ABSTRACT OF THE DISCLOSURE

An apparatus for the continuous dispersion of predominantly viscous substances, such as lacquers, is formed of a housing composed of a lower mixing chamber and an upper lead-off chamber with a passageway communicating between the two. The mixing chamber has a larger transverse cross sectional area than the lead-off chamber and is provided with an adjustable liner jacket for selectively varying the cross sectional area of the mixing chamber. One or more agitators are provided in the apparatus and each comprises a shaft extending into the interior of the mixing chamber, means for rotating the shaft connected to its outer end, and vanes having cutting edges connected to the shaft within the mixing chamber. Material feed pipes are telescopically movably mounted in the walls of the mixing chamber with their inner ends positioned in the vicinity of the vanes. The pipes are telescopically mounted so that they may be moved relative to the vanes depending upon various factors affecting the dispersion operation. At the outlet from the mixing chamber to the lead-off chamber, the walls of the mixing chamber converge providing a passageway of reduced cross section as compared to the regular cross section of the mixing chamber. Within this reduced cross sectional area a plate member is positioned in parallel with the plane of the opening and with its edge spaced from the walls of the mixing chamber providing a passageway between the mixing chamber and the lead-off chamber. Preferably, the plate member has a corrugated appearance for properly directing the flow of the material being mixed. An outlet pipe is provided in the upper end of the lead-off chamber for removing materials from the apparatus. In this apparatus, the feed pipes deliver the material into the mixing chamber at a location closely spaced from the vanes. The vanes are variably rotatable up to high speeds for mixing and imparting to the materials an upward vertical flow path for passing them around the edge of the plate member into the lead-off chamber and then to the outlet pipe at the upper end of that chamber.

---

In order to obtain as homogeneous as possible a distribution and as uniform as possible properties of polyphase systems and highly viscous substances of all kinds, it is known to use homogenizing, dispersing and emulsifying machines, such as epicyclic agitators, centrifugal mixers, gear and kneading pumps of the most widely varying kinds. For mixing highly-viscous substances double armed kneading machines and multirolling mechanisms have been developed. For refining ground material, slow-running agitator mills with small grinding bodies or high-speed agitator mills are used. A sufficient degree of homogenization is however frequently only obtained after running the machine for several hours. By using ball mills the time taken for grinding can be considerably reduced. For fine-grinding pigments in film-forming products a high speed agitator mill has been developed which works with sand and is known commercially as a "sand mill." The best-known of these agitator mills is provided with removable troughs and a section member stand which takes the drive shaft and the drive motor. In a further known embodiment the agitator bearsr are arranged stationary and have removable bottoms to change the beads or colour. These known agitator mills are of compact construction. These mills are for example not suitable for the production of clear lacquers.

The known apparatus for dispersing fine grinding or homogenizing work discontinuously. Apparatus such as kneading pumps which are also suitable for continuous working are only suitable for the mixing or thorough kneading of certain substances. Furthermore it can occur, that in all know apparatus a sufficient maxing or homogenizing of the starting material or starting materials is only possible if these materials are led through a long mixing area which however has, as a result, that such apparatus are of relatively large size and thus take up a lot of room for their installation or that the materials must be led through one and the same apparatus many times. The multiple leading through one mixing apparatus or the homogenizing or dispersing in an apparatus for a long period of time necessitates the installation of apparatus which is uneconomic and involves high costs. Furthermore it occurs that the duration times for the various mixings in the apparatus must be taken into consideration and these are variable from product to product and also depend on the purpose to which the dispersed materials are going to be put. Long durations normally lead to a blocking of the apparatus for other mixing purposes. The works must therefore undertake corresponding planning if a sufficient number of suitable machines are not available.

Furthermore it is essential that, for example, for the production of lacquer, clear or coloured lacquers, and lacquers with a plastics base no apparatus is known which guarantees a continuous working. In known apparatus which works continuously the mixture must be produced outside of the apparatus separately. The finished mixture is then homogenized or dispersed. This invention relates to a method and apparatus for continuous dispersion of particularly viscous substances of all kinds and the production of an end product with a highly homogeneous distribution not obtainable with the known methods and apparatus and which has uniform properties. Surprisingly it was possible to produce highly dispersed finely ground or highly homogenised products and in particular synthetic lacquers in accordance with the invention in a continuous process in such a way that starting materials are fed directly under pressure into a closed system in the turbulence zone of a turbo-agitator with air excluded, the mixture being kept in rotation by vorticity and the finished product being continuously drawn off at a point above the feed point for the starting material. This is the basis of the invention.

An apparatus in accordance with the invention consists of a cylindrical container with a narrowed upper discharge chamber for the finished product and a chamber type widened part taking a turbo-agitator in which feed pipes for the starting materials are arranged and are lengthened for direct impingment onto the turbo-agitator. The feed pipes for the starting materials are telescopically movably guided in the container wall. The volumetric capacity of the chamber-like widened container part is 300 cubic centimeters.

The agitator is a high-speed propeller agitator with cutting edges provided on the vanes. The agitator spindle may be arranged in the container horizontally or vertically.

In accordance with another feature of the invention several containers are connected to a column type finished unit; the discharge pipe of each container is then connected with the feed pipes of the following container by which the possibility is given to lead the mixture continuously through several containers which can have turbo-agitators running at different speeds if a particularly high degree of dispersion of the starting material in the end product is required. Should a multiphase system be produced, the discharge pipes of several containers attached to a complete unit is connected to a feed pipe of the following container. The single phases are then fed into the mixture in the individual containers.

Specific embodiments of the invention will now be described by way of example with reference to the accompanying drawings in which.

FIG. 3 shows several superimposed containers connected to a column-type finished unit, the discharge pipes for the finished product from each container being attached to the feed pipes of the following container; and FIG. 4 shows several containers in series where, however, there is added to each container a new starting component and to the mixture produced in the preceding container, partly in elevation, partly in section.

Figure 1:
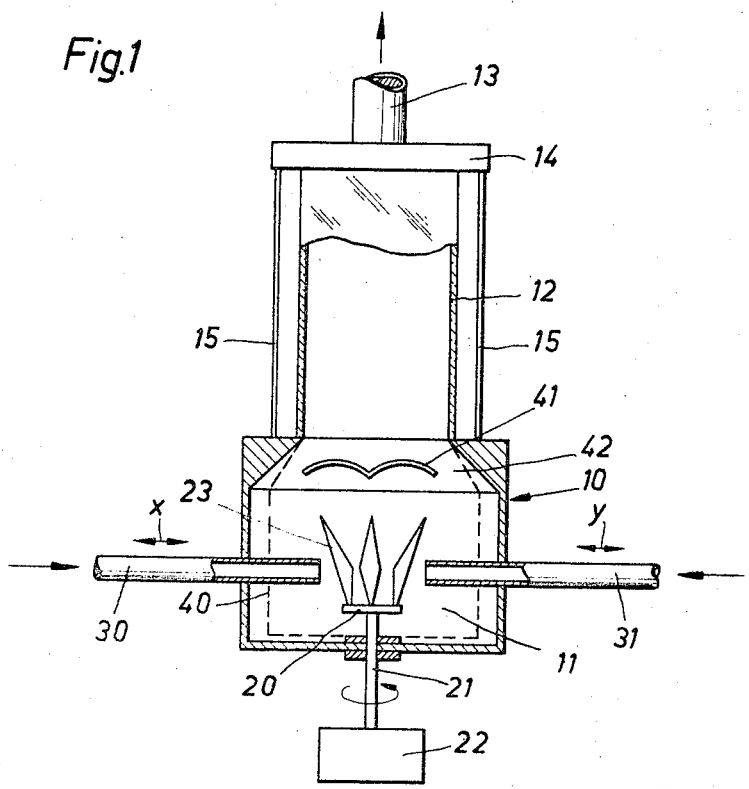
FIG. 1 shows a container with an agitator partly in elevation and partly in vertical section.
Figure 9:
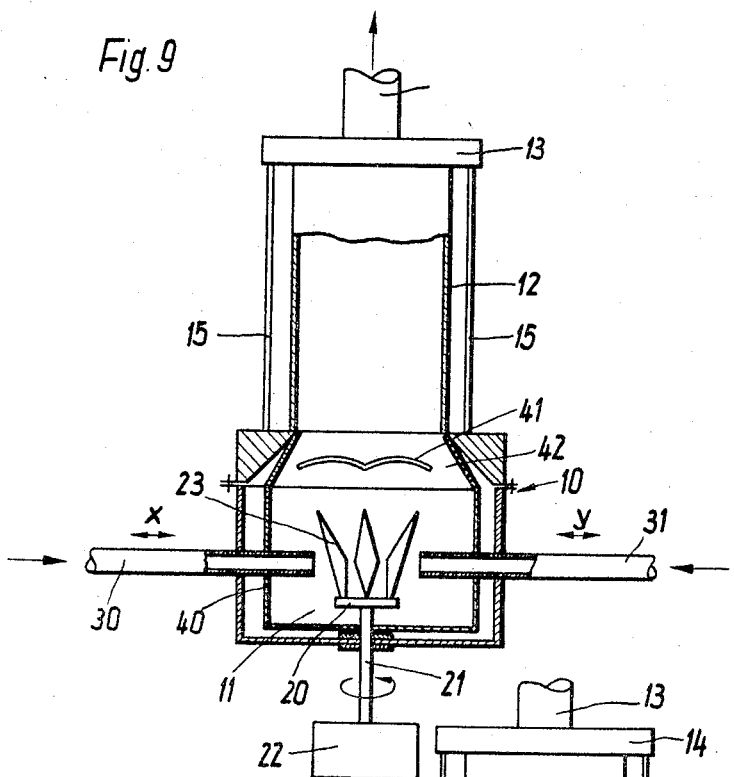
Figure 10:
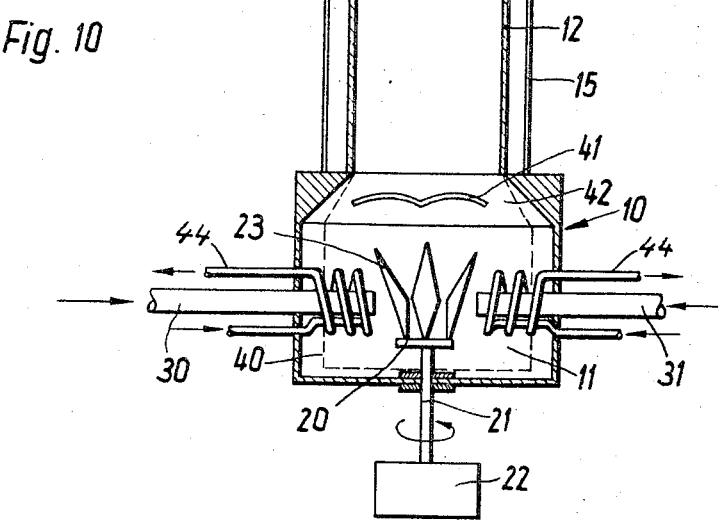

FIGS. 5, 6, 7, and 8 are views similar to FIG. 1 illustrating a plurality of agitator arrangements;

FIG. 9 is a view similar to FIG. 1 disclosing the jacket within the container; and FIG. 10 is a view similar to FIG. 1 illustrating cooling coils on the feed pipes.

In FIGURE 1 the cylindrical container 10 consists of a chamber type widened part 11 and an upper narrow lead-off chamber 12 to which a discharge pipe 13 is attached. The container 10 preferably consists of corrosion resistant materials. The narrow lead-off chamber 12 is an inspection glass which is held in the upper ring 14 which is fastened by means of connecting rods 15 to the widened part 11. Several single inspection glasses can be provided in the container. The chamber-like widened container part has a volumetric capacity of 300 cubic centimeters. In the chamber type widened part 11 of the container 10 there is arranged preferably in the middle an agitator 20 which is connected to a drive motor 22 via a vertical spindle 21 the number of revolutions per minute of the drive motor 22 is continuously adjustable from 1 to 50,000 revolutions.

Figure 2:
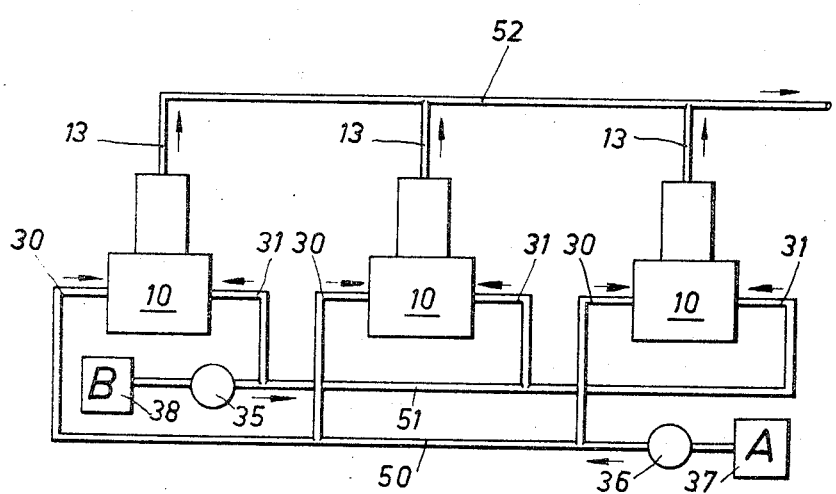
FIG. 2 shows several containers with a common discharge pipe for the finished product.
Figure 5:
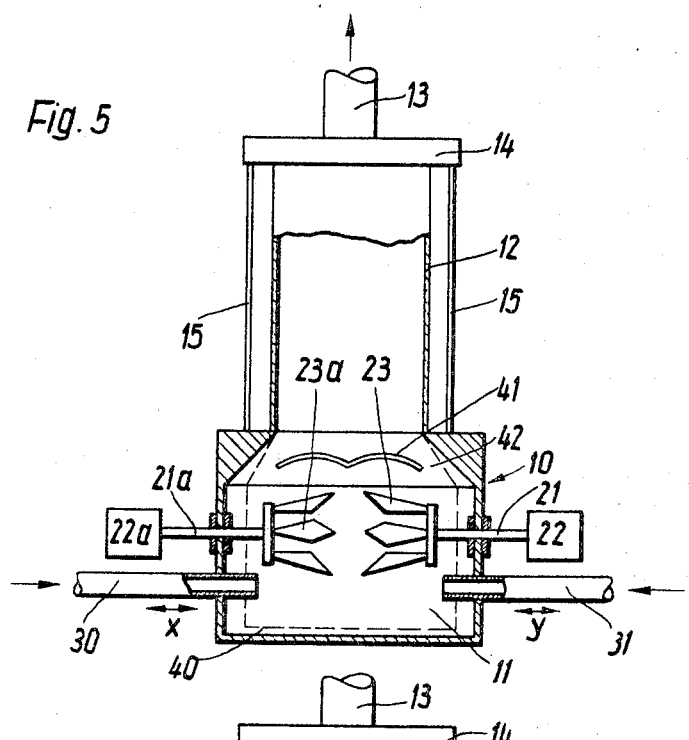
Figure 6:
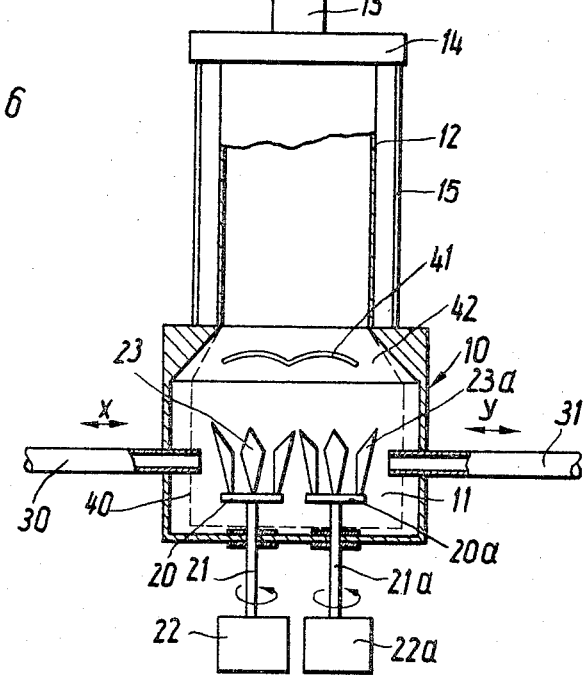
Figure 7:
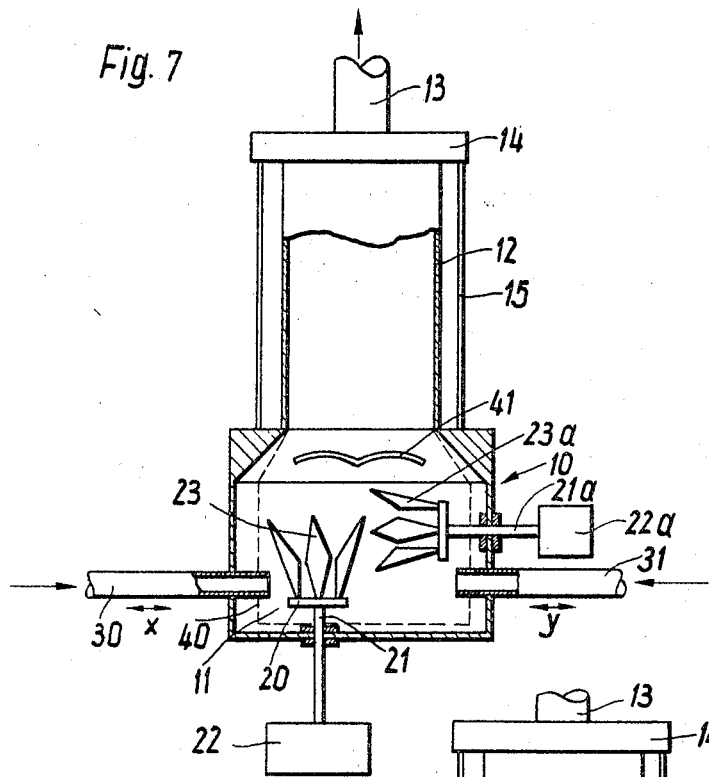
Figure 8:
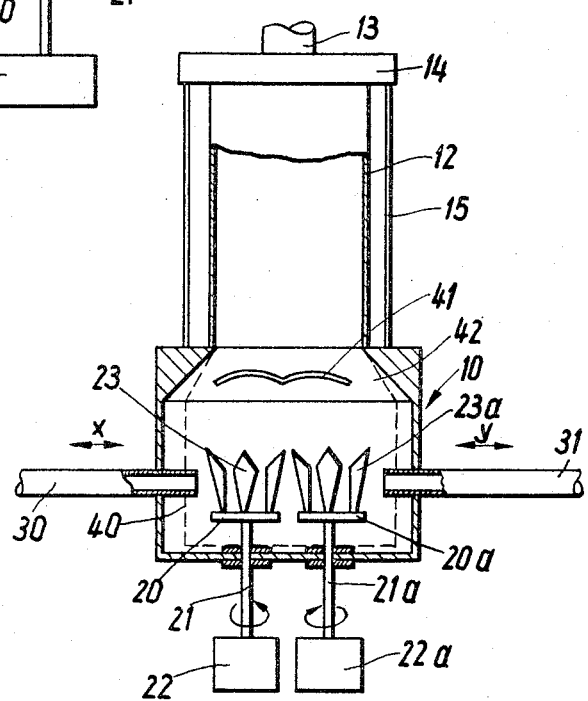

The chamber type widened component 11 of the container 10 has feed pipes 30, 31. The number of feed pipes depends on the number of starting materials which form the basis of the finished product. The feed pipes 30, 31 are extended to the point of direct impingement of the agitator 20 right into the interior of the container 10. The free ends of the feed pipes 30, 31 are preferably made nozzle-shaped in the zone of the agitator 20. In order to be able to vary the distance of the nozzle-shaped ends of the feed pipes 30, 31 from the agitator 20, the feed pipes 30, 31 are made telescopically movable in the wall of the container 10, as shown by the arrows X and Y. The feed pipes 30, 31 are connected via metering pumps 35, 36 with the supply containers 37, 38 for the starting materials A and B (FIGURE 2).

The agitator 20 takes the form of a high speed propeller agitator with cutting edges provided at the vanes 23. It is however also possible to provide in the chamber type widened container component 11 two propeller agitators 23, 23a with horizontal or vertical drive spindles (see FIGS. 5 and 6). The propeller agitators are, if the drive spindles are arranged horizontally, made opposite one another and rotate in opposed directions. It is however also possible to arrange in the chamber type container component 11 a propeller agitator with a vertical drive spindle and a propeller agitator with a horizontal drive spindle (see FIG. 7). However, differently formed agitators can be utilised.

To vary the size of the mixing chamber inside the chamber type widened container component 11, the propeller agitator 20 and the feed pipes 30, 31 are arranged in a jacket casing 40 in acocrdance with a further form of embodiment, which is shown shaded in FIGURE 1. The jacket casing 40 can be inserted in the container 10 and is such that the lead-off chamber 12 is adjacent to the upper opening of the jacket casing. The jacket casing 40, see FIG. 9, has the most varied dimensions, which however are also kept smaller than the inner dimensions of the chamber type widened component 11 of the container 10. In this way homogenising or dispersion or grinding processes, can be carried out in smaller containers if required.

In order to avoid overheating during homogenising or dispersion, the container 10 can be provided with a cooling device arranged at the outer or inner wall of the container. If an exchangeable jacket casing 40 is used, then it is possible to arrange the cooling element at the inner jacket 40. It is greatly advantageous however if the starting materials are cooled directly before being fed into the centre of turbulence of the agitator. Thus, for example, the cooling elements 44 can be arranged at the outer walls of the sections of the feed pipes 30, 31 arranged in the inner space of the chamber see FIG. 10.

In order to increase the vorticity of the starting materials fed into the chamber 11, a profiled lead-off plate 41 can be provided above the agitator 20, which is of such dimensions, that between the plate 41 and the chamber wall there is provided a space 42 for leading off the mixed components into the lead-off chamber 12.

The device for carrying out the continuous mode of operation makes it possible to produce finished products, in particular lacquers, coloured lacquers and synthetic lacquers of the highest and consistent quality. The starting material can still in addition be very finely ground. High degrees of homogenising and dispersion are obtained. From the storage container for the starting material to the drawing-off of the finished product the method of operation is not interrupted. The continuous process works with air completely excluded. Crusty residues, for example, lacquers, are obviated. In this way rapid cleaning of the complete device is possible. The device does not need to be dismantled for cleaning. Cleaning agents are merely directed through the device. The chamber 11 cleans itself with the vorticity of the actual cleaning agent. In the shortest time possible the device is cleaned so that there are no long interruptions in the lacquer production. The device in accordance with the invention makes possible the conversion from one kind of lacquer to another kind of lacquer in the shortest time possible. The end products produced in accordance with the continuous process are of consistent quality even when starting materials of different qualities are used, which is usually the case wtih the starting materials for production of synthetic resin lacquers. If, for example, a new lacquer is produced, then laboratory tests are no longer necessary. Also small quantities, for example only kg. at the end product, can be obtained, so that large additions are no longer necessary. If tests with small additions are satisfactory, then large-scale production can always be undertaken. Also small quantities, for example 5 metric tons of a certain kind of lacquer can be produced as easily as large amounts of say, 50 metric tons and over.

The following examples illustrate the invention.

*Example I*

The containers made in accordance with the invention with a volumetric capacity of 300 cubic centimeters are fed via the feed pipe 30 with 90% of the total product synthetic resins dissolved in a solvent and via the feed pipe 31 with 10% of the total product paraffin dispersion in the region of the rotating propeller agitator 20. The total amount of the starting materials supplied in each case amounts to 200 cubic centimeters. The starting materials fed under pressure by means of metering pumps flow from the nozzle-like free ends of the feed pipes and meet violently in the centre of turbulence of the propeller agitator and on the agitator vanes, the cutting edges of which causes an additional splitting up action of the particles striking against each other. The high-speed agitator imparts a very powerful vorticity of the starting materials. At the same time there is effected an additional fine grinding of the particles and a dispersion of the starting materials. The finished product present in the turbulence chamber 11 is whirled in the lead-off chamber, as the turbulence zone of the agitator extends up into the lead-off chamber 11 of the container 10, and is conveyed from here via the pipe 13 to a discharge and/or weighing station. During the further continuous metering of the starting components the necessary metering proportion of the starting components to each other in each case is kept for producing the required finished product. In accordance with the speed with which the starting materials are fed to the container 10, the finished product is lead-off. In using the turbulence chamber made in accordance with the invention it has been shown, that there occurs no alteration in the metering proportion, since the starting materials do not remain long in the turbulence chamber. After the starting materials have been fed into the chamber and after vorticity there follows directly the discharge of the finished product. There is always obtained a finished product of consistent quality with the same physical properties, which in the production of lacquers, in particular clear lacquers is of considerable importance.

*Example II*

The capacity of a chamber 10 with a volumetric capacity of 300 cubic centimeters makes possible the production of 2 metric tons of end product per hour. However, if it is required to increase the quantity of end product, then several containers 10 can be arranged in line. The feed pipes 30 are then connected via a main pipe 50 to the container 37 for the starting material A and the feed pipes 31 via a main pipe 51 to the container 38 for the starting components B. The discharge pipes 13 are then led together (FIGURE 2) into a collecting pipe 52 for the end product. By means of three chambers 10 six metric tons of end product are then obtained.

*Example III*

If it is necessary for the production of a certain end product, that reaction mixture must be led through several containers, in which the mixture is treated differently, then several containers 10 can be superimposed to make a finished unit. According to FIGURE 3 four containers 10 are arranged in column type cylindrical casing 60 one above the other and on intermediate bases 61, 62, 63, 64 and connected with each other in such a way that the discharge pipes 13 of each container 10 are in the form of twin pipes and are connected to the feed pipes 30, 31 of following container in each case. The starting materials A and B conveyed from the containers 65, 66 by means of metering pumps 67, 68 via the feed pipes 30, 31 to the lowest container 10 and conveyed from this to the containers 10 arranged on the intermediate bases 62, 63, 64. The finished product is then taken away via the pipe 13 of the container 10 on the bases 64. The feed of the starting materials or mixtures prepared in the separate containers is carried out by the metering pumps 65, 66. The agitators in the containers 10 have different speeds of rotation. The speed of rotation can increase from container to container so that the mixture in the lowermost container is whirled at a very low rotation speed, while the agitator in the uppermost container has the highest speed of rotation. The vorticity of the individual mixtures is thus gradually increased.

*Example IV*

For the production of an end product consisting of a multiphase system or several components, one container 10 can be used, in whose turbulence chamber the individual components are fed simultaneously in the metering proportion necessary in each case or several can be put to use, which are arranged one above the other and to which the individual starting materials are fed. In the arrangement according to FIGURE 4 four containers 10 are arranged in a cylindrical casing 70 on intermediate bases 71, 72, 73, 74. The discharge pipes 13 of each container are connected to the feed pipes 30 of the following container in each case, while via the second feed pipe 31 of each container the individual starting materials are fed. The materials A and B are fed to the container 10 from the supply containers 75, 76 by means of metering pumps 77, 78 via the pipes 30, 31. Via the pipe 13 and the pipe 30 of the container 10 on the intermediate base 72 the finished product of the first stage is conveyed to the turbulence chamber of the container 10. Here in the second stage the starting material C is metered via the pipe 31 by means of the metering pump 79 from the supply container 80. The finished product of the second stage is brought into contact in the container 10 on the intermediate base 73 with the starting material D and in the fourth stage the starting material E is added. The starting material D is metered by means of the metering pump 81 from the supply container 82 and the starting material E by means of the metering pump 83 from the container 84 to the containers 10 on the intermediate bases 73 and 74. The finished product consisting of components A, B, C, D and E is then taken away by the pipe 13 of the uppermost container 10. The supply containers 80, 82 and 84 for the components C, D and E can be arranged with metering pumps 79, 81 and 83 outside the casing 70 on the shelves 85 attached to the side of this casing. There is also however the possibility of arranging the suply containers for all components on the floor. The supply containers are then connected via correspondingly long dimensioned pipes to the chambers of the container 10. The metering pump strokes are synchronised so that a uniform flow of the components or mixtures through the whole apparatus is assured.

What I claim is:

1. Apparatus for the continuous dispersion of predominantly viscous substances comprising walls forming a mixing chamber having an opening in the upper part thereof, walls forming a lead-off chamber having an opening in the lower part thereof, said lead-off chamber located above said mixing chamber with the opening in its lower part in communication with the opening in the upper part of said mixing chamber, said lead-off chamber having an outlet opening therefrom spaced above said opening in communication with said mixing chamber, at least one agitator located in said mixing chamber, said agitator comprising a shaft extending into said mixing chamber through the walls thereof, means for rotating said shaft disposed exteriorly of said mixing chamber, and vanes connected to and extending from said shaft within said mixing chamber, said vanes having cutting edges thereon, material feed pipes telescopically movably mounted in said walls forming said mixing chamber and extending from said walls into the interior of said mixing chamber whereby the ends of said pipes are movably positionable relative to said vanes of said agitator, and a plate member located in said mixing chamber closely spaced below and in parallel relationship with the plane of the opening in the upper part of said mixing chamber, at least a portion of the edge of said plate member spaced from the inner surface of said walls forming said mixing chamber and providing a passageway therebetween whereby the materials supplied though said feed pipes into said mixing chamber are mixed and flow upwardly through the passageway into said lead-off chamber for discharge therefrom through its outlet opening.

2. Apparatus as set forth in claim 1, wherein said mixing chamber and said lead-off chamber are in vertical alignment with said mixing chamber having a greater horizontal cross sectional area than the horizontal cross sectional area of said lead-off chamber.

3. Apparatus as set forth in claim 2, wherein said mixing chamber has a capacity of about 300 cubic centimeters.

4. Apparatus as set forth in claim 2, wherein said mixing chamber and said lead-off chamber are cylindrical in shape and have a common axis.

5. Apparatus as set forth in claim 2, wherein said walls of said mixing chamber at the opening communicating with said lead-off chamber are in converging relationship toward the opening whereby the opening has a smaller cross sectional area than the remaining horizontal cross sectional area of said mixing chamber.

6. Apparatus as set forth in claim 5, wherein said plate member is horizontally positioned at the reduced cross sectional area portion of the opening from said mixing chamber, said plate member having a generally corrugated cross sectional shape, and said plate member having a smaller horizontal area than the horizontal area of the opening from said mixing chamber to said lead-off chamber.

7. Apparatus as set forth in claim 2, wherein a liner jacket arranged to be of variable dimensions is disposed with and lines the sides and bottom of said mixing chamber for varying the interior dimensions of said jacket and thereby varying the volume within said mixing chamber.

8. Apparatus as set forth in claim 1, wherein said feed lines are horizontally arranged within said mixing chamber.

9. Apparatus as set forth in claim 1, wherein a single said agitator is positioned within said mixing chamber and has its shaft oriented vertically.

10. Apparatus as set forth in claim 1, wherein at least agitators are positioned within said mixing chamber with the shafts thereof arranged horizontally and the vanes disposed in opposed relationship.

11. Apparatus as set forth in claim 1, wherein at least a portion of the walls forming said lead-off chamber are formed of a translucent material.

12. Apparatus as set forth in claim 1, wherein at least two said agitators are disposed within said mixing chamber and said shafts of said agitators are disposed vertically and are positioned adjacent to each other.

13. Apparatus as set forth in claim 1, wherein two said agitators are disposed within said mixing chamber with one of said agitators having its shaft disposed vertically and the other said agitator having its shaft disposed horizontally.

14. Apparatus as set forth in claim 1, wherein two said agitators are disposed within said mixing chamber with the vanes on said shafts of said agitators disposed in contra-rotating relationship.

15. Apparatus as set forth in claim 1, wherein cooling means are disposed around the ends of said feed pipes within said mixing chamber.

16. Apparatus as set forth in claim 1, wherein a multiplicity of combined mixing chambers and lead-off chambers are disposed in serially arranged relationship, pipe means interconnecting the outlet from at least one of said lead-off chambers to the feed pipes of another combined chamber arrangement.

17. Apparatus as set forth in claim 16, wherein the combined mixing chambers and lead-off chambers are arranged in superposition in a column type production unit and are interconnected for the serially upward passage of the materials mixed in the combined chambers from the lower to the upper chambers.

18. Apparatus as set forth in claim 1, wherein a multiplicity of combined mixing chambers and lead-off chambers are disposed in spaced relationship, and at least a pair of common said feed pipes connected to each of said mixing chambers for supplying materials to be mixed in parallel flow relationship therein.

19. Apparatus as set forth in claim 18, wherein the outlet from the lead-off chambers of said combined mixing chambers and lead-off chambers are connected to a common discharge pipe.

20. Apparatus as set forth in claim 1, wherein a plurality of combined mixing chambers and lead-off chambers are interconnected for forming a production unit, and said agitators within said combined chambers operated at different speeds of rotation.

21. Apparatus as set forth in claim 1, wherein material supply pipes are connected to said feed pipes, and metering means are disposed within said material supply pipes for regulating the flow of materials into said mixing chamber.

References Cited
UNITED STATES PATENTS

| | | | |
|---|---|---|---|
| 2,584,424 | 2/1952 | Cornell | 259—96 |
| 3,206,171 | 9/1965 | Levake | 259—8 |
| 3,265,365 | 8/1966 | Ward et al. | 259—8 |
| 3,306,587 | 2/1967 | Schroedter | 259—4 |

FOREIGN PATENTS 1,086,757  8/1954  France.

ROBERT W. JENKINS, *Primary Examiner.*

U.S. Cl. X.R.

259—6